US008418051B1

(12) United States Patent
Bourdev

(10) Patent No.: US 8,418,051 B1
(45) Date of Patent: Apr. 9, 2013

(54) REVIEWING AND EDITING WORD PROCESSING DOCUMENTS

(75) Inventor: Lubomir D. Bourdev, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1440 days.

(21) Appl. No.: 10/912,964

(22) Filed: Aug. 6, 2004

(51) Int. Cl.
*G06F 17/21* (2006.01)

(52) U.S. Cl.
USPC .................... 715/230; 715/229; 715/255

(58) Field of Classification Search .............. 715/500, 715/511, 512, 513, 526, 200, 229, 230, 234, 715/255
See application file for complete search history.

(56) References Cited

U.S. PATENT DOCUMENTS

| | | | | |
|---|---|---|---|---|
| 5,671,428 A * | 9/1997 | Muranaga et al. | ............ | 715/751 |
| 5,819,295 A | 10/1998 | Nakagawa et al. | | |
| 5,819,300 A | 10/1998 | Kohno et al. | | |
| 5,893,114 A | 4/1999 | Hashimoto et al. | | |
| 5,956,509 A * | 9/1999 | Kevner | ........................ | 719/330 |
| 6,243,722 B1 | 6/2001 | Day et al. | | |
| 6,266,683 B1 * | 7/2001 | Yehuda et al. | ................ | 715/234 |
| 6,289,390 B1 * | 9/2001 | Kavner | ........................ | 719/310 |
| 6,421,691 B1 | 7/2002 | Kajitani | | |
| 6,430,607 B1 * | 8/2002 | Kavner | ........................ | 709/217 |
| 6,606,660 B1 | 8/2003 | Bowman-Amuah | | |
| 6,675,197 B1 | 1/2004 | Satoh et al. | | |
| 6,742,015 B1 * | 5/2004 | Bowman-Amuah | ........... | 718/101 |
| 6,918,082 B1 | 7/2005 | Gross et al. | | |
| 6,957,384 B2 * | 10/2005 | Jeffery et al. | .............. | 715/501.1 |
| 7,480,662 B2 * | 1/2009 | Potapov et al. | ........................ | 1/1 |
| 7,493,322 B2 | 2/2009 | Franciosa et al. | | |
| 7,818,678 B2 * | 10/2010 | Massand | ........................ | 715/751 |
| 2002/0019827 A1 * | 2/2002 | Shiman et al. | ................ | 707/200 |
| 2002/0049787 A1 | 4/2002 | Keely et al. | | |
| 2002/0059325 A1 * | 5/2002 | Beizer et al. | .................. | 707/203 |
| 2002/0083079 A1 | 6/2002 | Meier et al. | | |
| 2002/0158901 A1 * | 10/2002 | Mezei | ........................ | 345/744 |
| 2003/0031996 A1 * | 2/2003 | Robinson | ........................ | 434/350 |
| 2003/0046639 A1 * | 3/2003 | Fai et al. | ........................ | 715/513 |
| 2003/0130993 A1 * | 7/2003 | Mendelevitch et al. | .......... | 707/3 |
| 2004/0085354 A1 * | 5/2004 | Massand | ........................ | 345/751 |
| 2004/0163042 A1 | 8/2004 | Altman | | |
| 2004/0199876 A1 * | 10/2004 | Ethier et al. | ................... | 715/523 |
| 2004/0237041 A1 * | 11/2004 | Koike et al. | ................... | 715/526 |
| 2004/0252888 A1 | 12/2004 | Bargeron et al. | | |
| 2005/0027589 A1 * | 2/2005 | Jenkins et al. | .................. | 705/11 |
| 2005/0028087 A1 | 2/2005 | Barrie et al. | | |
| 2005/0044295 A1 | 2/2005 | Wakeam et al. | | |
| 2005/0053283 A1 | 3/2005 | Wakeam et al. | | |

(Continued)

OTHER PUBLICATIONS

Adobe Acrobat Help, "Sharing Comments on a Server," pp. 143-144, 2001.

(Continued)

*Primary Examiner* — Stephen Hong
*Assistant Examiner* — Gregory J Vaughn
(74) *Attorney, Agent, or Firm* — Schwegman Lundberg Woessner P.A.

(57) ABSTRACT

Methods and systems, including computer program products, implementing techniques for reviewing and editing word processing documents. The techniques include receiving from a reviewer a first comment about a word processing document receiving from the reviewer a second comment about the word processing document, sending the first comment to one or more editors and independently sending the second comment to one or more editors. The first comment can be sent before the second comment is received.

25 Claims, 8 Drawing Sheets

U.S. PATENT DOCUMENTS

| | | |
|---|---|---|
| 2005/0086224 A1 | 4/2005 | Franciosa et al. |
| 2005/0138541 A1* | 6/2005 | Euchner et al. ............... 715/512 |
| 2005/0154983 A1 | 7/2005 | Hailey et al. |
| 2005/0160355 A1 | 7/2005 | Cragun et al. |
| 2005/0160356 A1 | 7/2005 | Albornoz et al. |
| 2005/0240428 A1* | 10/2005 | Gabrick et al. ................... 705/1 |
| 2006/0184452 A1* | 8/2006 | Barnes et al. ................... 705/50 |
| 2006/0259524 A1* | 11/2006 | Horton .......................... 707/201 |
| 2010/0235763 A1* | 9/2010 | Massand ....................... 715/753 |

OTHER PUBLICATIONS

Boyce, et al., Special Edition Using Microsoft Office 97 Professional, Best Sellers Edition, 1997, Que Corporation, pp. 909-910, 1099-1110 and 1123.

* cited by examiner

REVIEWING AND EDITING WORD PROCESSING DOCUMENTS

BACKGROUND

The present invention relates to reviewing and editing word processing documents.

Word processing systems allow for the creation of documents, primarily textual documents that might otherwise be prepared on a typewriter. Such documents will be referred to as word processing documents, or simply, documents. The created documents can be edited, saved, or printed using the word processing systems. The word processing systems also allow for non-textual content (e.g., images or video clips) to be included in the document. A document does not necessarily correspond to a file. A document can be stored in a portion of a file that holds other documents, in a single file dedicated to the document in question, or in multiple coordinated files.

Word processing documents can be represented in a variety of document formats. One document format is the portable document format (PDF), available from Adobe Systems Incorporated of San Jose, Calif. PDF is a format for representing documents in a manner that is independent of the source system used to create those documents. The source system can have its own format, which will be referred to as the source format. Other document formats include markup language formats, for example, XML (extensible markup language). XML is a markup language for marking data with markup tags that indicate what data is being described. For example, the word "phone" placed within markup tags could indicate that the data that followed is a phone number.

Conventional systems for reviewing and editing documents enable an author to create a document and submit the document for review by a reviewer. A reviewer may read the document and provide comments about the document. In some examples, the comments may include proposed changes to the document. The reviewer then submits the document with any comments to an editor. The editor reads the comments and may make changes to the document based on the comments suggested by the reviewer, resulting in a new version of the document. In some instances, the editor may be the author. After reviewing the document and any comments submitted by the reviewer, and after making any changes to the document, the editor may again submit the new version of the document to a reviewer for a second review. After receiving a second draft, a reviewer is faced with a challenge of determining exactly what changed between the first draft and the second draft, and how the reviewer's comments have been incorporated into the draft.

SUMMARY

Methods and systems, including computer program products, implementing techniques for reviewing and editing word processing documents.

In one general aspect, the techniques include receiving from a reviewer a plurality of comments about a word processing document. The comments include a first and second comment. The techniques further include associating the comments with the word processing document; and assigning the comments to one or more editors. The first comment is assigned to a first editor, and the second comment is assigned to a second editor.

The techniques can be implemented to include one or more of the following features.

The word processing document includes a plurality of sections; and assigning the comments to one or more editors includes, for each section of the document, assigning the comments for that section to a designated editor for that section.

The techniques further include sorting the comments according to their assigned editors. The techniques further include presenting the comments to one of the editors, where only the comments that are assigned to the editor are presented.

The techniques further include receiving from the first editor input requesting reassignment of the first comment from the first editor to the second editor; and in response to the input, performing the requested reassignment.

The word processing document is in PDF format. The word processing document is in a markup language format. The reviewers and the editors share a single copy of the word processing document.

In another general aspect, the techniques include receiving from a reviewer a first comment about a word processing document, receiving from the reviewer a second comment about the word processing document, sending the first comment to one or more editors, and independently sending the second comment to one or more editors.

The techniques can be implemented to include one or more of the following features.

Sending the first comment to one or more editors includes sending the first comment to one or more editors before the second comment is received.

Presenting a current version of the comments to a reviewer or editor, and for one or more of the comments, categorizing the comment according to whether or not the current version of the comment has been viewed before by the reviewer or editor.

The word processing document is in PDF format. The word processing document is in a markup language format. The reviewer and the editors share a single copy of the word processing document.

In another general aspect, the techniques include receiving from an editor a first change to a word processing document, receiving from the editor a second change to the word processing document, sending the first change to one or more reviewers; and independently sending the second change to the one or more reviewers.

The techniques can be implemented to include one or more of the following features.

Sending the first change to the one or more reviewers includes sending the first change to a reviewer before the second change is received.

The word processing document is in PDF format. The word processing document is in a markup language format. The editor and the reviewers share a single copy of the word processing document.

In another general aspect, the techniques include receiving from a reviewer one or more comments about a word processing document, receiving from an editor one or more changes to the word processing document; and classifying each change under one of the comments.

The techniques can be implemented to include one or more of the following features.

Classifying each change under one of the comments includes receiving from the editor input associating each change with one of the comments. Selecting a subset of the comments and presenting the word processing document so that the changes that are classified under the selected comments are distinguishable from the changes that are not classified under the selected comments.

Classifying each change under one of the comments includes, for each comment, storing all the changes classified under the comment in a document difference record for the comment. Presenting the word processing document includes presenting the document difference record for each of the selected comments.

Two or more comments are selected and presenting the document difference record for each of the selected comments includes combining the document difference record for each of the two or more selected comments into a composite document difference record, and presenting the composite document difference record.

The word processing document is in PDF format. The word processing document is in markup language format. The reviewer and the editor share a single copy of the word processing document.

The techniques can be implemented to realize one or more of the following advantages.

When a reviewer creates a comment, he can assign it to a particular editor. An editor can reassign the comment to another editor. The comments can be presented to an editor in a selective manner, such that only the comments assigned to the editor are presented to the editor.

When a reviewer creates a comment, he can immediately send it to an editor before he creates another comment. The reviewer need not finish making all of his comments before submitting the comments to the editor. This allows the editor to begin editing before the review process is complete.

It is easy for a reviewer to determine what has changed between the first and second draft of a document under review. The second draft can be presented so that only the changes that pertain to a particular comment made by the reviewer are presented to the reviewer.

The details of one or more implementations are set forth in the accompanying drawings and the description below. Other features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
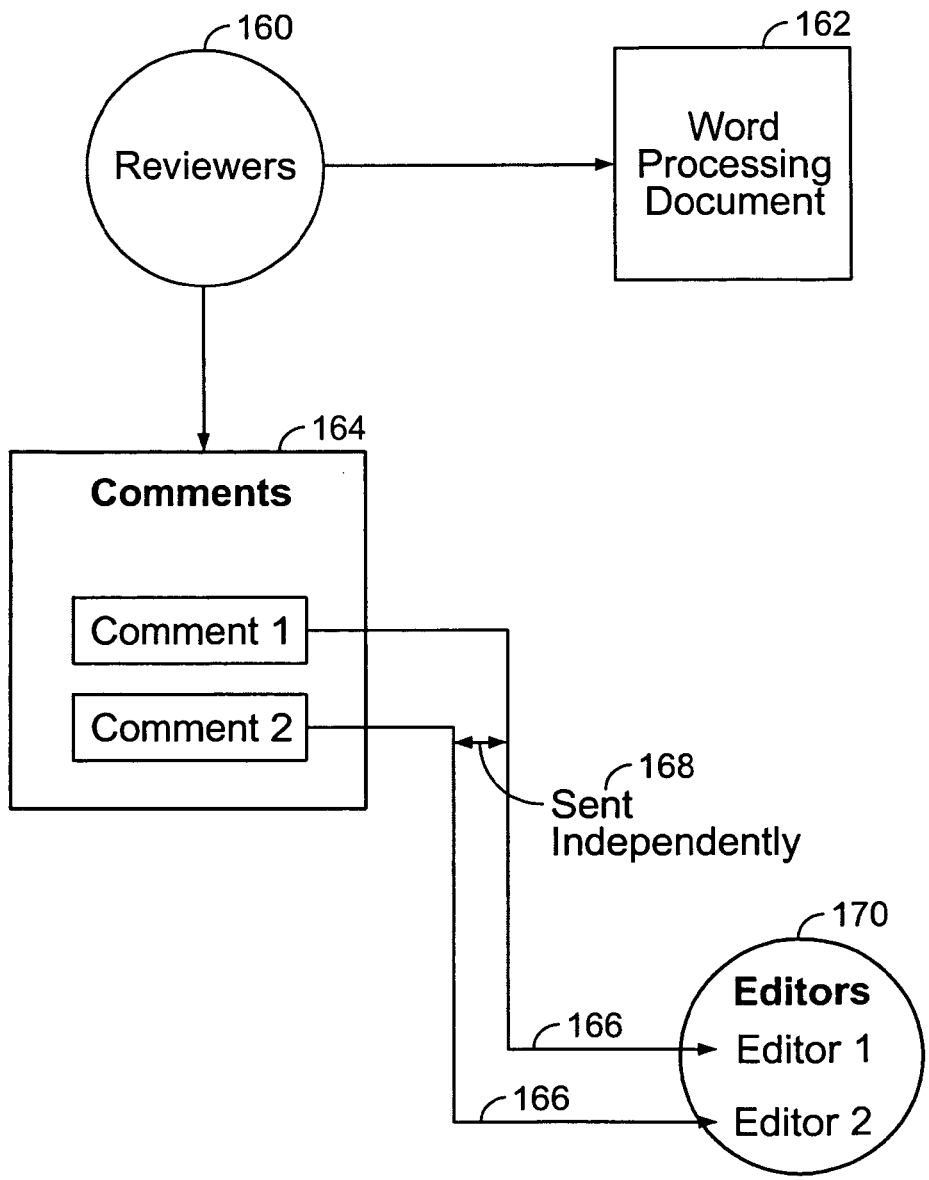
FIG. 1A illustrates comments being exchanged between reviewers and editors.

As shown in FIG. 1A, a word processing document 162 can be reviewed by one or more reviewers 160 and can be edited by one or more editors 170. The reviewers 160 can make comments 164 about the document 162 and assign the comments 166 to the editors 170. A reviewer or editor can be a human or alternatively, can be a machine programmed to perform a reviewing or editing function.

Different comments can be assigned and sent to different editors. For example, in FIG. 1A, comment 1 is assigned and sent to editor 1 and comment 2 is assigned and sent to editor 2.

Figure 1B:
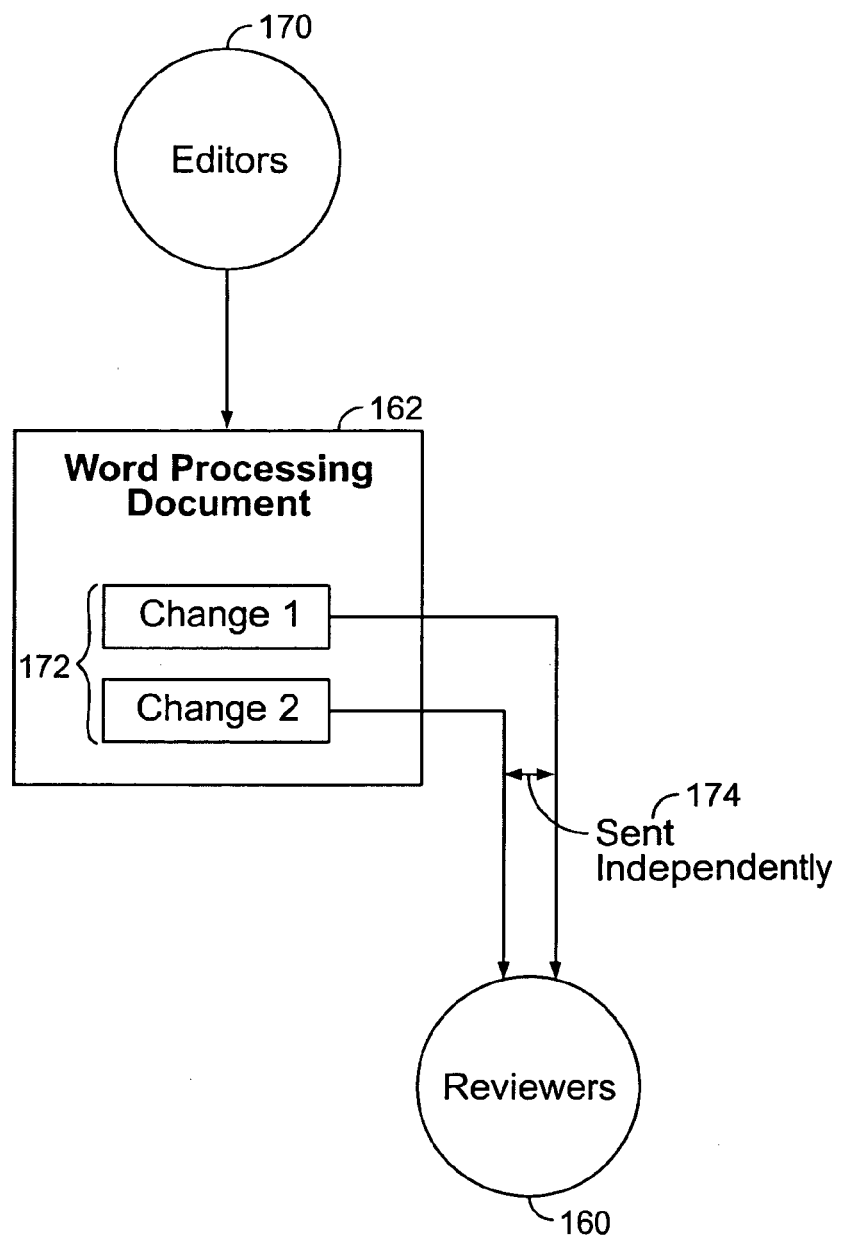
FIG. 1B illustrates document changes being exchanged between editors and reviewers.

As shown in FIG. 1B, the editors 170 can make changes 172 to the document as a result of the comments received from the reviewers 160. The changes 172 can be sent back to the reviewers 160 for their review.

As shown in FIGS. 1A and 1B respectively, comments can be sent independently 168 of other comments and changes can be sent independently 174 of other changes. Comments and changes can be sent as soon as they are completed, so that the recipients can begin reviewing the comments and changes while further comments and changes are still being completed. In this manner, the review and editing process is expedited.

Figure 1C:
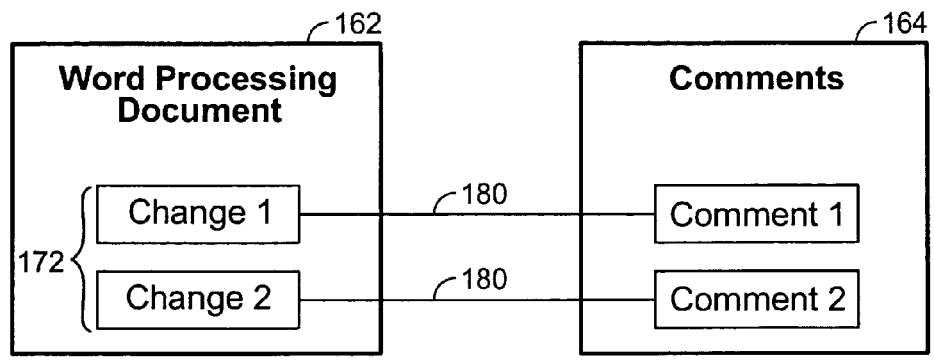
FIG. 1C illustrates document changes classified according to comments.

As shown in FIG. 1C, changes 172 can be classified 180 according to the comments 164. For example, in FIG. 1C, change 1 is classified under comment 1 to represent that change 1 was made as a result of comment 1. Similarly, change 2 is classified under comment 2. This makes it easier for reviewers to check that all their comments were addressed by the changes.

Figure 1E:
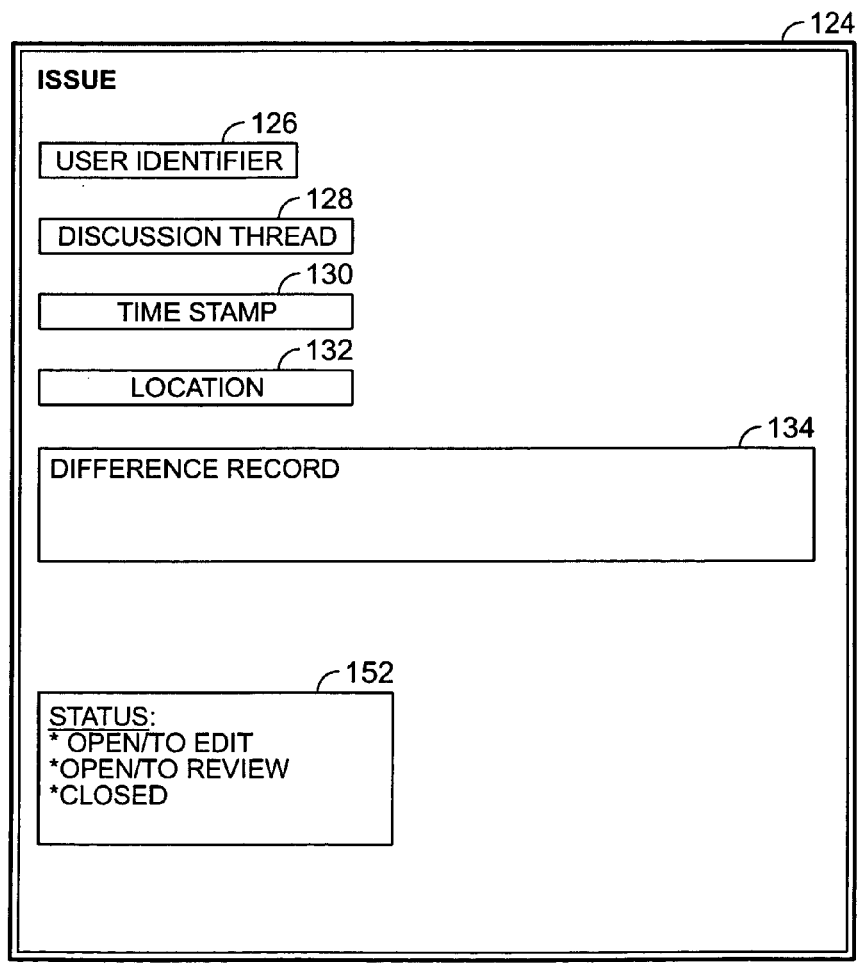
FIG. 1E illustrates an issue and its data structure components.
Figure 1D:
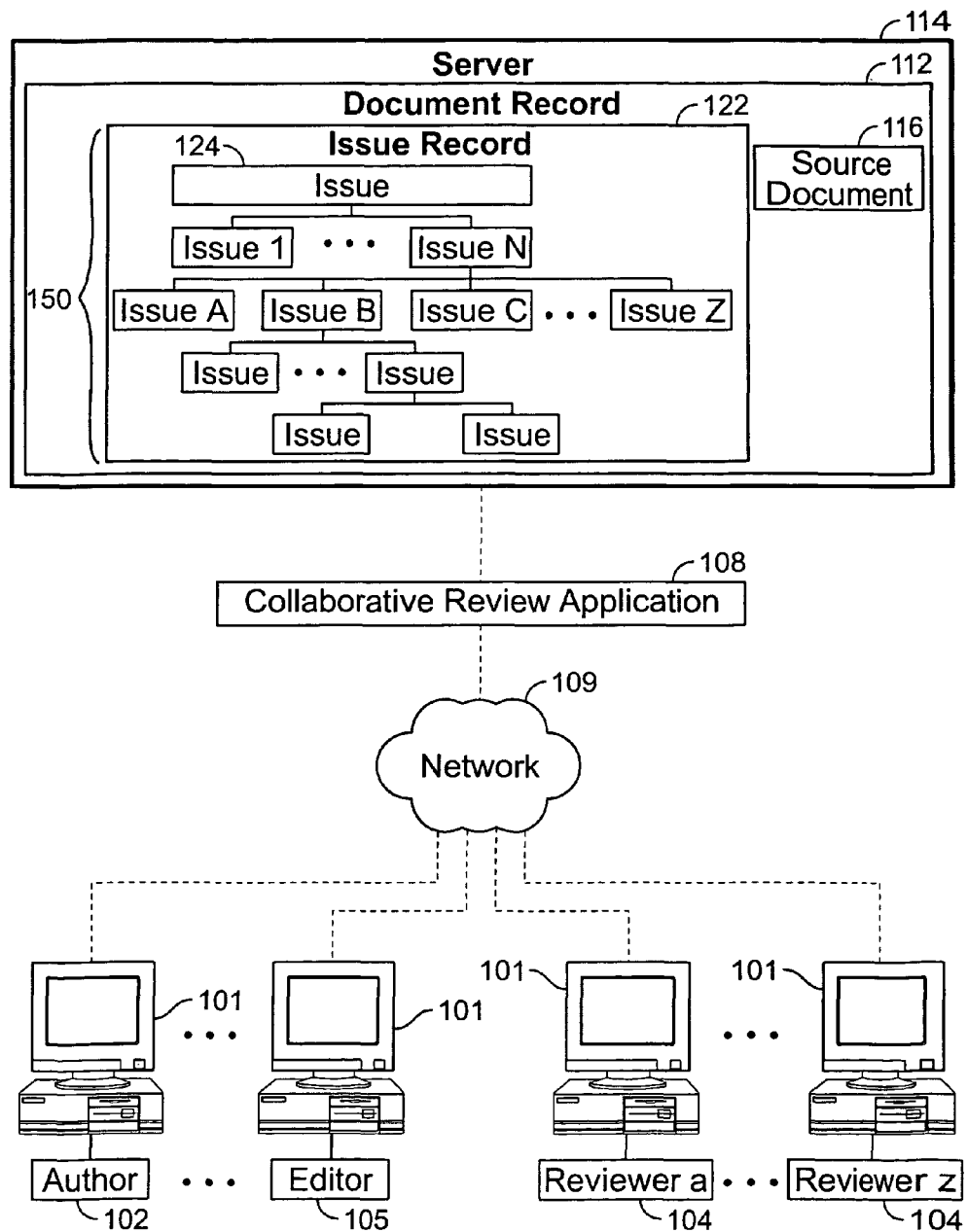
FIG. 1D is a block diagram of a system for reviewing and editing documents.

As shown in FIG. 1D, in one implementation, a system 100 includes client computers 101 used for reviewing and editing documents. In general, a client computer refers to a general-purpose computer that is capable of accessing a user interface (e.g., a desktop personal computer, a workstation, or a laptop computer running an application program), or a more special-purpose computer (e.g., a device specifically programmed to operate as a client of a particular application program).

In the illustrated example, an author 102 creates a document. The author 102 submits the created document for review by one or more reviewers 104. The reviewers 104 read the document and associate one or more comments with the document in a review mode. In general, a comment relates to a reviewer's suggestions and ideas relating to the document. A comment can contain proposed changes relating to the document. In this specification, a comment may also be referred to as an issue. The two terms are used interchangeably.

In an edit mode, one or more editors 105 reviews the issues generated by the reviewers 104 and makes changes to the document as a result of the issues generated by the reviewers. The author 102 may be an editor 105. Again in a review mode, a reviewer 104 may, in turn, view the changes made by the editor 105.

In FIG. 1D, users engage in a collaborative review process relating to the document by accessing a collaborative review system 108 using the client computers 101. A collaborative review system 108 refers to any computer system which can be used to enable one or more users, such as, for example, editors and/or reviewers to engage in an electronically interactive review and editing process of a document. The collaborative review system 108 can run locally on each of the client computers 101 or can run remotely and accessed using a network 109. The network 109 can be one of a variety of established networks, such as, for example, the Internet, a Public Switched Telephone Network (PSTN), the world wide web (WWW), a wide-area network ("WAN"), a local-area network ("LAN"), or a wireless network.

The collaborative review system 108 provides access to a document record 112 for the document. The document record 112 includes the document as well as the issues associated with the document.

In the illustrated example, the document record 112 is stored on a server 114. The document record 112 includes the version of the document initially created by the document author, referred to as a source document 116. In one implementation, the source document 116 can be represented in more than one format. For example, it can be represented in the source format as well as in another format, for example, in PDF format.

Additionally, issues generated by the reviewers 104, in a review mode, are stored in an issue record 122 and are accessible to the editors 105, in an edit mode. The one or more reviewers 104, using client computers 101 to access the collaborative review application 108, can access the document record 112 for review and addition of issues to the issue record 122.

The system 100 is implemented such that a reviewer 104 in a review mode of the system 100 can generate an issue and submit the issue to the issue record 122, enabling the editor 105 to access the submitted issue in the document record 112. The reviewer 104 can continue to review the document and generate additional issues in the review mode while the editor 105 accesses the submitted issue. There is no need for the editor 105 to wait for the reviewer 104 to review the entire electronic document before the editor 105 can view issues generated by the reviewer 104.

The issue record 122 contains issues 124 associated with the document. FIG. 1B shows an implementation of the issue 124 and its data structure components associated with electronic document review. The issue 124 includes a user identifier 126 uniquely identifying a user who generated the issue 124. For example, the user identifier 106 can identify a reviewer 104. The issue 124 also includes a discussion thread 128 for a user to enter written comments, such as for example, suggestions for the document. A time stamp 130 indicating the time the issue 124 is submitted to the issue record 122 is included. The issue 124 also includes location information 132 that associates the issue 124 with a particular location in the document. This location can be user-selected, and can vary in granularity depending on what the user selects. The granularity can range from a single character to the whole document.

Additionally, the issue 124 includes a difference record 134 indicating all changes made to the document by the editors 105 as a result of the issue 124. For example, when an editor 106 accesses an issue, all changes made to the document by the editor while the issue is accessed are stored in a difference record 134 for the issue.

In one implementation, the document is comprised of a set of atomic elements, such as, for example, a sequence of characters. The difference record 134 contains a description of operations that transform one sequence of characters into another. The operations can include: inserting a character after a given character position, deleting a character at a given position, and/or replacing one character with another (this can be described as delete followed by insert). There are infinitely many sequences of these three operations that convert one version of the document into another. The process of generating the difference record will be described in more detail below with reference to FIG. 3.

When in edit mode, the editor 105 "opens" one issue at a time for review, the editor 105 can make changes to the document based on the issue, and the editor 105 "closes" the addressed issue once the changes are made. Changes made by the editor 105 accessing an issue between the opening and closing of the issue are stored as part of the issue's difference record 134. Upon closing an issue, the issue is automatically submitted to the document record 112. The end of edit mode is indicated by the closing of the issue 124, i.e. submission of the issue to the document record 112.

An issue submitted to the document record 112 is available for access by a reviewer or editor. The difference record 134 of a submitted issue can be presented to a reviewer or editor to show the changes made to the document as a result of the issue. For example, referring to FIG. 1A, a reviewer 104 can access a submitted issue N to view changes made by the editor 105 to the document as a result of the issue N.

The reviewer 104 can then generate an additional issue A relating to a version of the document associated with the initial issue N. In the system 100, the issues in the issue record 122 are organized in a tree structure 150. Each issue in the tree structure 150 contains information associating the issue with its parent issue. In the illustrated example, issue N is the parent issue of issue A. In other implementations, the issues in the issue record 122 can be organized as a list.

Additionally, referring to FIG. 1E, the issue 124 has a status 152 indicating, for example, if the issue is "Open/To Edit," "Open/To Review," or "Closed." Each issue can be automatically categorized as "old" or "new/changed" for each reviewer and editor in the collaborative review application 108. When an issue is created or changed, it is considered "new/changed" for every user other than the originator of the changes. When an editor 105 closes the issue, it is considered "old" for the editor 105. When a reviewer 104 views the document difference record 134 for an issue, it becomes "old" for the reviewer 104. However, using the collaborative review application 108, the reviewer 104 and the editor 105 can mark an old issue back to "new/changed" if it requires their future attention.

In addition to viewing changes as a result of one or more issues, using the system 100 document editors and reviewers are able to synchronize to the latest version of the document. For example, selecting a "Get Latest Changes" button in the collaborative review application 108 can display the latest version of the document to users.

Figure 2:
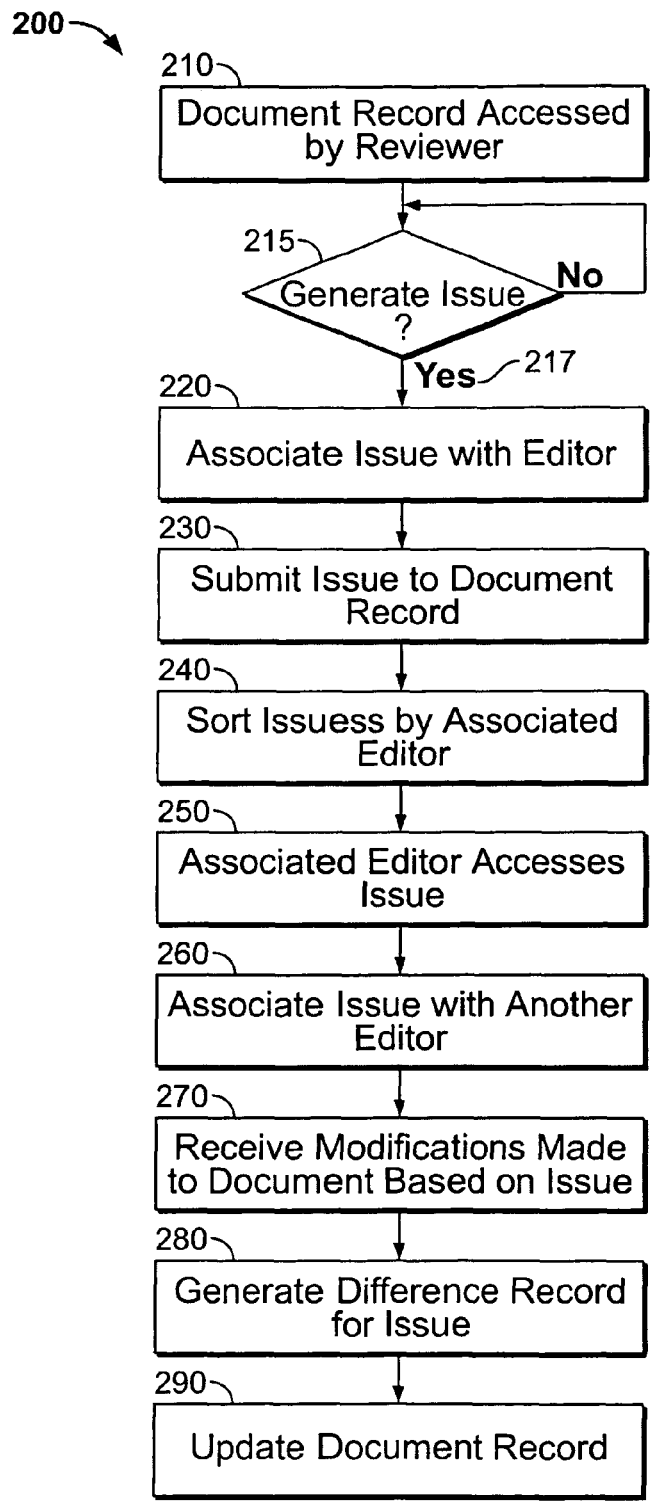
FIG. 2 is a flow chart of a process illustrating the creation of an issue.

FIG. 2 is a flow chart of a process 200 illustrating the creation of an issue associated with electronic document review. The process 200 can be implemented by a system similar to the system 100 illustrated in FIG. 1A. A system implementing the process 200 can be implemented such that multiple editors can have access to the document record 112. The process 200 illustrates associating a document editor 105 with an issue 124.

When a reviewer 104 creates an issue, the reviewer 104 can assign the issue to one or more editors 105. For example, the reviewer 104 can select editors from a list of editors. The editors 105 can search/sort issues assigned only to them. An editor can also reassign an issue to another editor. Sections of documents can be pre-assigned to editors. An issue made in a given section can by default be assigned to the editor responsible for that section.

In the process 200, a document record associated with a document for review is accessed by a reviewer (210). The process 200 waits for the reviewer to generate an issue (215). When an issue is generated (217), the issue is associated with an editor (220). The issue is submitted to the document record (230). The submitted issues in the document record are sorted by editor (240). The editor associated with an issue is allowed to access the issue (250). Optionally, the assigned editor can reassign the issue to another editor (260). Modifications made to the document based on the issue are received (270). A difference record 134 for the issue 124 is generated based on the received modifications (280). The document record 112 is updated (290).

Figure 3:
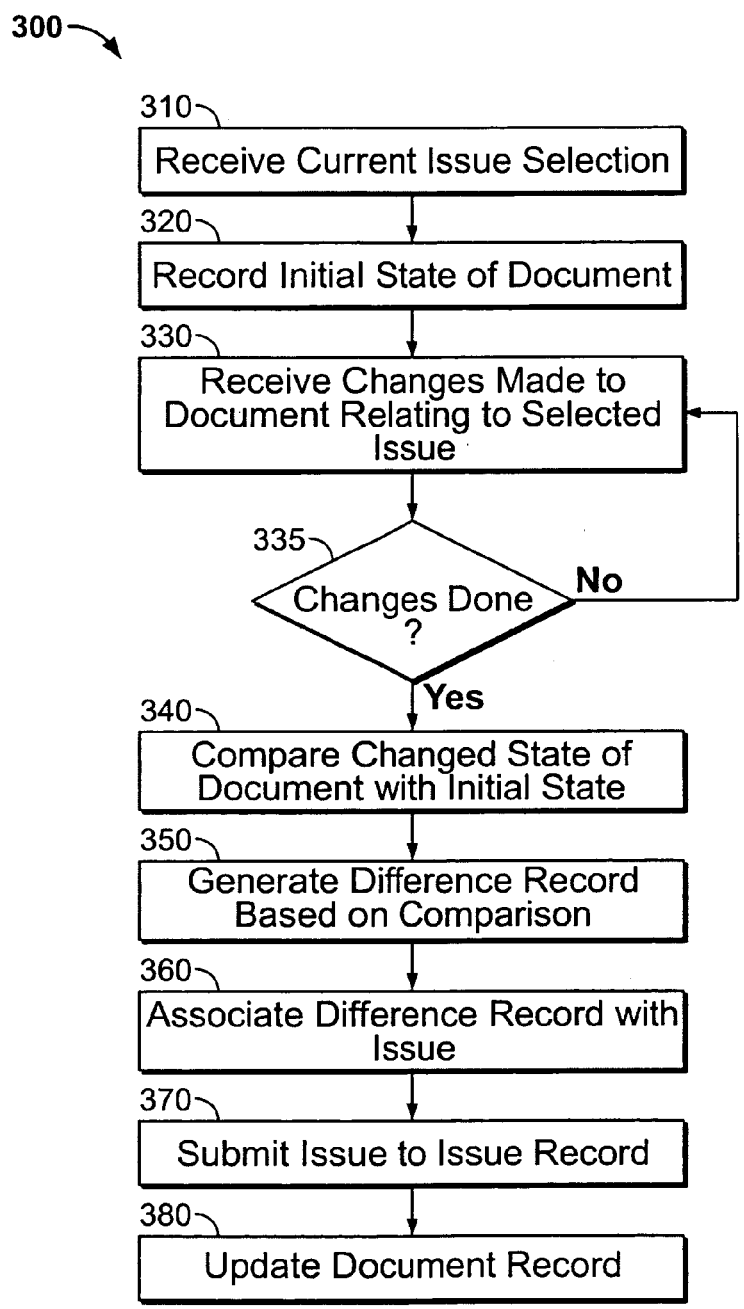
FIG. 3 is a flow chart illustrating a process for associating document changes with an issue.

FIG. 3 is a flow chart illustrating a process 300 for associating changes made to a document with an issue 124. The process 300 can be implemented by a system similar to the system 100 illustrated in FIG. 1A. The process 300 begins with receipt of a "current issue" selection from a user (310). When an editor desires to make changes to a document based on issues, one issue at a time is designated as the "current issue" and all changes associated with that issue are recorded in the issues difference record.

When an editor first activates an issue, i.e. selects an issue as the current issue, the initial state of the document is recorded (320). This can be accomplished by storing a snapshot of the document in the document record 112. Changes made to the document by the editor are received (330). When an indication is received that the editor is done making changes associated with the current issue (335), the changed state of the document is compared with the recorded initial state (340). This comparison can be performed using conventional document comparison tools. One such tool is the windiff tool, which is part of Visual Studio 6, available from Microsoft Corporation of Redmond, Wash. The output of this comparison is stored in the difference record 134 (350). The difference record 134 is associated with the issue (360). The issue is submitted to the issue record 122 for the document (370), and the document record is updated (380).

An application for implementing a document review process can be designed such that each reviewer and/or editor has his/her own workspace. The workspaces will contain information common to the document record 112. Using their own workspace editors and reviewers can generate and/or review issues associated with a document. Each workspace may be hosted, for example, on the client computers 101 illustrated in FIG. 1. Each reviewer and editor can also have information that is specific to his or her workspace (and different for other reviewers and editors). For example, a flag for each issue indicating whether or not the reviewer or editor has addressed an issue is specific to each workspace.

Figure 4:
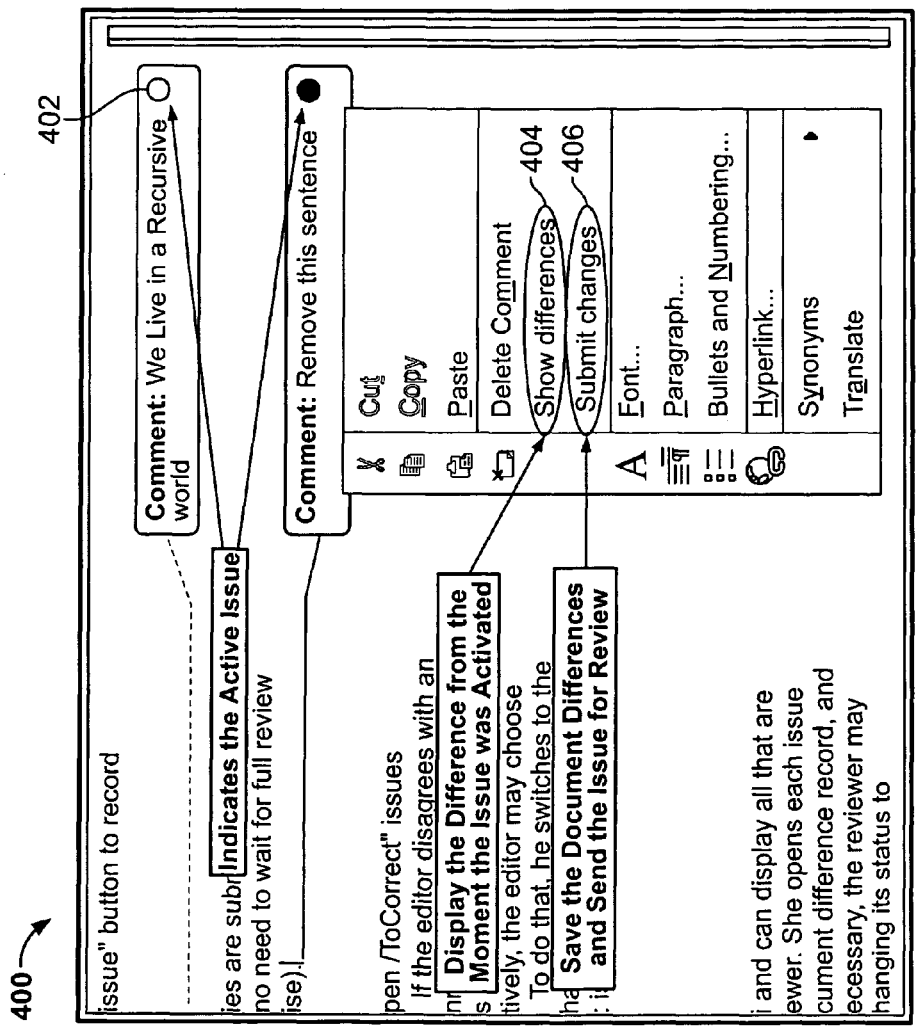
FIG. 4 illustrates an interface for display to an editor in a document review process.

FIG. 4 illustrates an interface 400 displayed to an editor in a document review process. The interface 400 can be an interface of the workspace described earlier. Additionally, the interface 400 can be an interface in an application similar to the collaborative review application 108 illustrated in FIG. 1A. The editor first activates an issue to be viewed in an edit mode. In the interface 400, an active issue is indicated by an open circle 402. When an issue is activated, an initial snapshot of the document is taken, as described earlier. The editor can then make changes to the document, while in the edit mode. The editor can optionally review the document changes from the initial snapshot by selecting a "Show differences" portion 404 of the interface 400. The editor can then submit the changes by selecting a "Submit changes" portion 406 of the interface 400. Submission classifies the issue as "old" for the editor and as a result the issue can be disabled or hidden on the interface 400.

Figure 5:
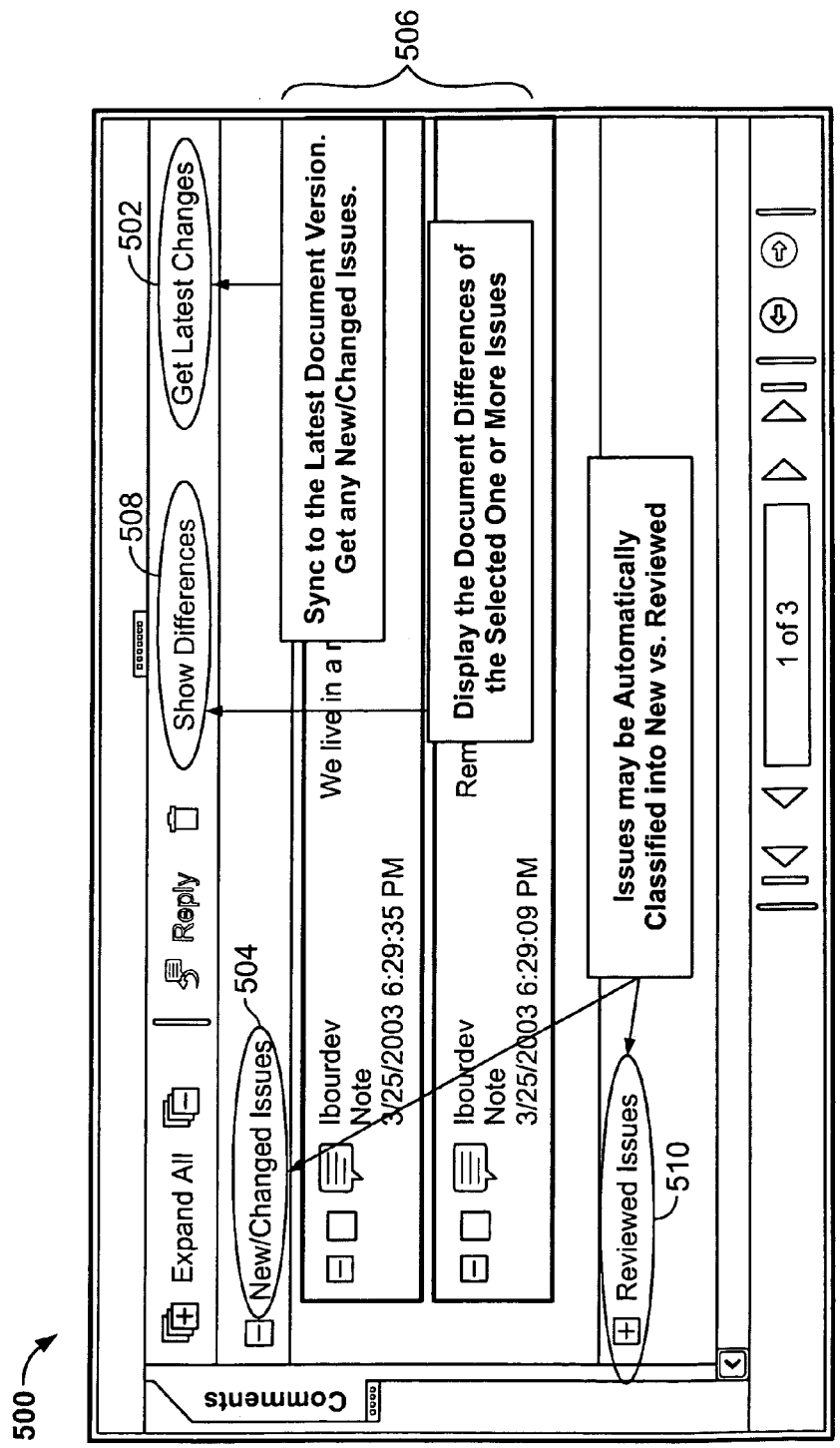
FIG. 5 illustrates an interface for display to a reviewer in a document review process.

FIG. 5 illustrates an interface 500 displayed to a reviewer in a document review process. The interface 500 can be an interface of the workspace described earlier. Additionally, the interface 500 can be an interface in an application similar to the collaborative review application 108 illustrated in FIG. 1A. Each reviewer reads the issues and can create sub-issues. The initial status of the issue is designated as "Open/To Correct". Issues are submitted one at a time and editors can have immediate access to them, by pressing a "Get Latest Changes" button 502. A "New/Changed Issues" folder 504 in the interface 500 includes a dynamic list 506 of all the issues the editor has not yet accessed. The dynamic list 506 can be implemented such that a reviewer can filter the list as the reviewer desires.

For example the reviewer may want to display all issues that are currently "Open/To Review and show them grouped into "New/Changed" vs. "Reviewed." The reviewer can open each issue one at a time, review the issue difference record, and if satisfied, the reviewer can set the issue's status to "Closed." If further changes are necessary, the reviewer can add comments to a discussion thread associated with an issue and submit the issue by changing the status to "Open/To Correct."

The reviewer can also select multiple issues and preview their common document difference record at once. In the interface 500, when one or more issues are selected, a "Show Differences" button 508 becomes enabled. Clicking the button 508 can display a union or a composite of the difference records for the selected issues. After the difference records for one or more issues are reviewed, the issue(s) automatically move to a "Reviewed Issues" folder 510. The reviewer can drag issues back to the "New/Changed Issues" folder 504 if the reviewer wants to get back to them later. Pressing the "Get Latest Changes" button 502 gets the latest copy of the document, and can move any newly editor-addressed issues back to the "New/Changed Issues" folder 504. A useful issue reviewing process for a reviewer can be to first review how each issue proposed by the reviewer has been addressed, and then to select all remaining issues in the "New/Changed Issues" folder 504 and review them at once, to see what else has changed due to addressing issues proposed by other reviewers, or due to new additions to the document.

Displaying differences between two versions of a document can be accomplished in multiple ways. In an example involving text-only documents, a single view can show removed text as crossed out and new text as highlighted. If the combined difference records of two or more issues are to be shown, and a portion of the document is changed by both issues, the chronologically last issue can take priority. In a highly advanced system, when previewing the document differences associated with an issue, portions of the changes that have been later on changed again (e.g. as a result of fixing subsequent issues) can be highlighted; users can even be enabled to jump to those issues.

In some cases, the changes for the selected issue or issues may depend on changes for other issues. For example, suppose that as a result of a first issue, the word "location" was changed to "position". Then as a result of a second issue, the word "position" was further changed to "place". In this example, the second change is dependent on the first change.

In such cases, the document difference record shows not only the changes for the selected issue or issues, but also the changes upon which the former-mentioned changes depend. However, the former-mentioned changes are distinguishable from the other changes. For example, they can be presented in a different color from the other changes.

The invention and all of the functional operations described in this specification can be implemented in digital electronic circuitry, or in computer hardware, firmware, software, or in combinations of them. The invention can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. Alternatively, the computing system can include computers that have a peer-to-peer relationship to each other.

The invention has been described in terms of particular implementations. Other implementations are within the scope of the following claims. For example, the steps of the invention can be performed in a different order and still achieve desirable results.

What is claimed is:

1. A method comprising:
   at a computer system comprising one or more processors and one or more memory devices, receiving from a reviewer data representing a first comment and a second comment about a word processing document and indicating that the first comment and the second comment are respectively assigned to a first editor and a second editor from among multiple editors, wherein the reviewer and the multiple editors share a single copy of the word processing document;
   sending, from the computer system, first data representing the first comment but not the second comment to the first editor in response to a first input from the first editor requesting immediate access to any submitted issues and based on said indicating that the first comment is assigned to the first editor;
   independently sending, from the computer system, second data representing the second comment but not the first comment to the second assigned editor in response to a first input from the second editor requesting immediate access to any submitted issues;
   receiving, at the computer system from the reviewer after the first data was sent to the first editor, data representing an additional comment about the word processing document and indicating that the additional comment is assigned to the first editor; and
   sending, from the computer system, data representing the additional comment to the first editor in response to a second input from the first editor requesting immediate access to any submitted issues and based on said indicating that the additional comment is assigned to the first editor.

2. The method of claim 1, wherein the word processing document is in PDF format.

3. The method of claim 1, wherein the word processing document is in a markup language format.

4. The method of claim 1, further comprising:
   presenting a current version of the comments to a reviewer or editor in a dynamic list; and
   for one or more of the comments, categorizing the comment in the dynamic list according to whether the current version of the comment is old or new/changed.

5. The method of claim 1, comprising:
   identifying the first editor, and the second editor based on the received data indicating that the first comment and the second comment are respectively assigned to the first editor and the second editor; and
   wherein sending the data representing the first comment comprises causing presentation of the first comment to the first editor, and independently sending the data representing the second comment comprises causing presentation of the second comment to the second editor.

6. The method of claim 5, wherein the received data indicating that the first comment is assigned to the first editor comprises input from the reviewer designating the first editor.

7. The method of claim 6, comprising:
   causing presentation to the reviewer of a list of editors for designation of the first editor with respect to the first comment.

8. The method of claim 7, comprising:
   receiving a request from an assigned editor to reassign a given comment to a new editor; and
   reassigning the given comment in response to the request.

9. A method comprising:
at a computer system comprising one or more processors and one or more memory devices, receiving from an editor data representing a first change to a word processing document, wherein the editor and multiple reviewers share a single copy of the word processing document;
sending, from the computer, data representing the first change to a first reviewer from among the multiple reviewers in response to a first input from the first reviewer requesting immediate access to any submitted issues;
receiving, at the computer system from the editor after the data representing the first change was sent to the first reviewer, data representing a second change to the word processing document;
sending, from the computer system, data representing the second change to the first reviewer in response to a second input from the first reviewer requesting immediate access to any submitted issues; and
independently sending, from the computer system, data representing the first change and the second change to a second reviewer from among the multiple reviewers in response to a first input from the second reviewer requesting immediate access to any submitted issues.

10. The method of claim 9, wherein the word processing document is in PDF format.

11. The method of claim 9, wherein the word processing document is in a markup language format.

12. A non-transitory, machine-readable storage device storing a computer program product comprising instructions operable to cause a programmable processor to perform operations comprising:
receiving from a reviewer data representing a first comment and a second comment about a word processing document and indicating that the first comment and the second comment are respectively assigned to a first editor and a second editor from among multiple editors, wherein the reviewer and the multiple editors share a single copy of the word processing document;
sending first data representing the first comment but not the second comment to the first editor in response to a first input from the first editor requesting immediate access to any submitted issues;
independently sending second data representing the second comment but not the first comment to the second assigned editor in response to a first input from the second editor requesting immediate access to any submitted issues;
receiving, from the reviewer after the first data was sent to the first editor, data representing an additional comment about the word processing document and indicating that the additional comment is assigned to the first editor; and
sending data representing the additional comment to the first editor in response to a second input from the first editor requesting immediate access to any submitted issues and based on said indicating that the additional comment is assigned to the first editor.

13. The non-transitory, machine-readable storage device of claim 12, wherein the word processing document is in PDF format.

14. The non-transitory, machine-readable storage device of claim 12, wherein the word processing document is in a markup language format.

15. The non-transitory, machine-readable storage device of claim 12, wherein the operations further comprise:
presenting a current version of the comments to a reviewer or editor in a dynamic list; and
for one or more of the comments, categorizing the comment in the dynamic list according to whether the current version of the comment is old or new/changed.

16. A non-transitory, machine-readable storage device storing a computer program product comprising instructions operable to cause a programmable processor to perform operations comprising:
receiving from an editor data representing a first change to a word processing document, wherein the editor and multiple reviewers share a single copy of the word processing document;
sending data representing the first change to a first reviewer from among the multiple reviewers in response to a first input from the first reviewer requesting immediate access to any submitted issues;
receiving, from the editor after the data representing the first change was sent to the first reviewer, data representing a second change to the word processing document;
sending data representing the second change to the first reviewer in response to a second input from the first reviewer requesting immediate access to any submitted issues; and
independently sending data representing the first change and the second change to a second reviewer from among the multiple reviewers in response to a first input from the second reviewer requesting immediate access to any submitted issues.

17. The non-transitory, machine-readable storage device of claim 16, wherein the word processing document is in PDF format.

18. The non-transitory, machine-readable storage device of claim 16, wherein the word processing document is in a markup language format.

19. A system comprising:
a computer-readable medium encoding a word processing document; and
processor electronics configured to perform operations comprising:
receiving from a reviewer a first comment and a second comment about a word processing document and indications that the first comment and the second comment are respectively assigned to a first editor and a second editor from among multiple editors, wherein the reviewer and the multiple editors share a single copy of the word processing document;
sending the first comment but not the second comment to the first editor in response to a first input from the first editor requesting immediate access to any submitted issues;
independently sending the second comment but not the first comment to the second assigned editor in response to a first input from the second editor requesting immediate access to any submitted issues;
receiving, from the reviewer after the first comment was sent to the first editor, an additional comment about the word processing document and an indication that the additional comment is assigned to the first editor; and
sending the additional comment to the first editor in response to a second input from the first editor requesting immediate access to any submitted issues and based on said indicating that the additional comment is assigned to the first editor.

20. The system of claim 19, wherein the word processing document is in PDF format.

21. The system of claim 19, wherein the word processing document is in a markup language format.

22. The system of claim 19, wherein the processor electronics are further configured to perform operations comprising:

presenting a current version of the comments to a reviewer or editor in a dynamic list; and for one or more of the comments, categorizing the comment in the dynamic list according to whether the current version of the comment is old or new/changed.

23. A system comprising:

a computer-readable medium encoding a word processing document; and processor electronics configured to perform operations comprising:

receiving from an editor a first change to the word processing document, wherein the editor and multiple reviewers share a single copy of the word processing document;

sending the first change to a first reviewer from among the multiple reviewers in response to a first input from the first reviewer requesting immediate access to any submitted issues;

receiving, from the editor after the first change was sent to the first reviewer, a second change to the word processing document;

sending the second change to the first reviewer in response to a second input from the first reviewer requesting immediate access to any submitted issues; and independently sending the first change and the second change to a second reviewer from among the multiple reviewers in response to a first input from the second reviewer requesting immediate access to any submitted issues.

24. The system of claim 23, wherein the word processing document is in PDF format.

25. The system of claim 23, wherein the word processing document is in a markup language format.

\* \* \* \* \*